Feb. 6, 1940.   M. P. HUBBELL   2,189,068
DRILL CHUCK
Filed April 15, 1938
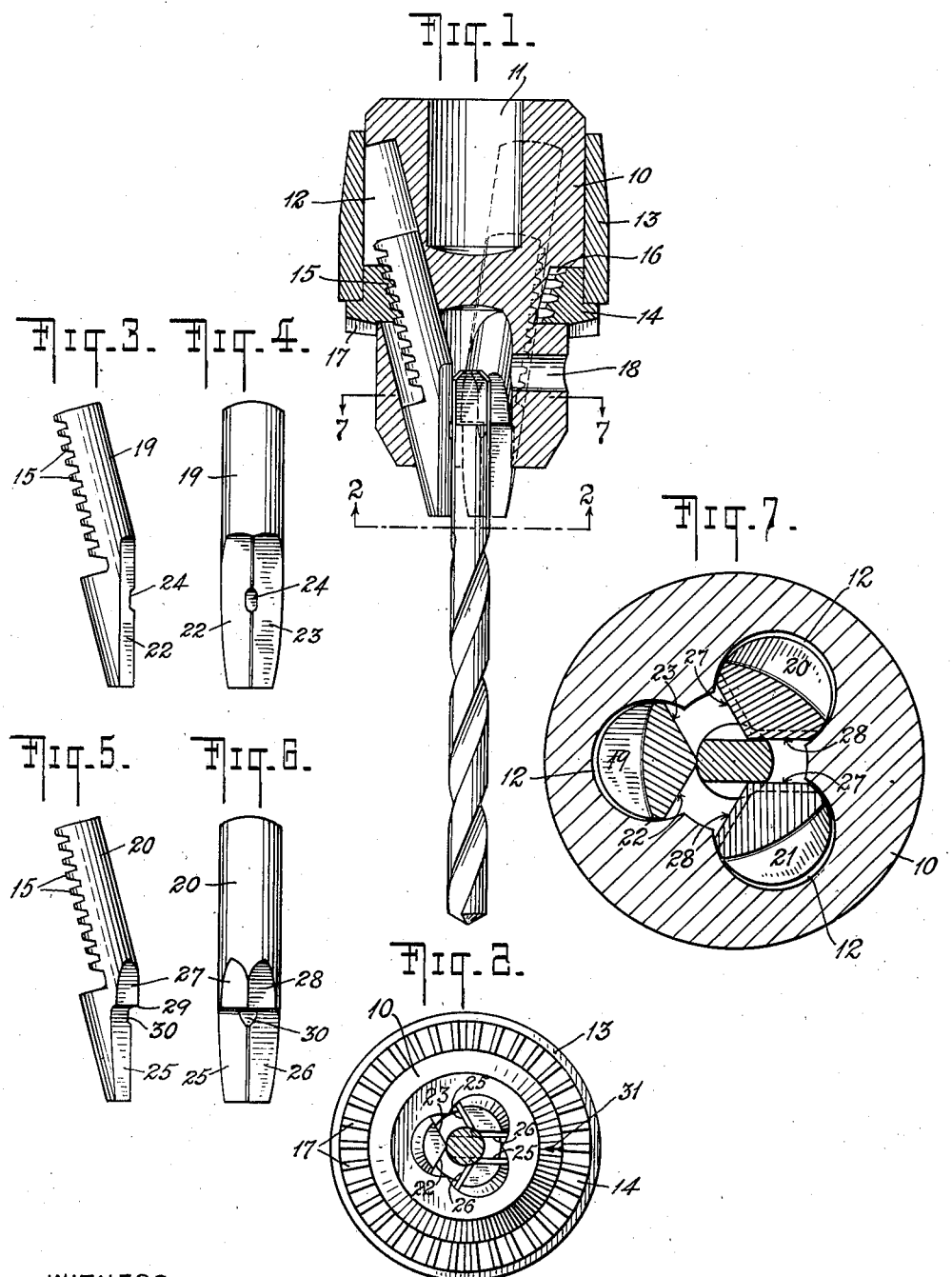
WITNESS
G. V. Rasmussen
INVENTOR
MINOTT P. HUBBELL
BY
ATTORNEYS Patented Feb. 6, 1940

2,189,068

UNITED STATES PATENT OFFICE 2,189,068

DRILL CHUCK

Minott P. Hubbell, Ashburnham, Mass.

Application April 15, 1938, Serial No. 202,146

1 Claim. (Cl. 279—62)

This invention relates generally to chucks and more particularly to drill chucks of the type known as "Almond chucks" and has for its principal object the adaptation of such a chuck without alteration with respect to the chuck body, the threaded ring, the sleeve, the jaw apertures, or the generally cylindrical character of the jaws so that the chuck will not only be capable of securely and accurately holding drills or bits having cylindrical shanks but will also provide a positive grip on the flattened sides of the ends of drill shanks when such shanks are provided with diametrically opposed flat surfaces at the upper end of such shanks.

The desirability of a chuck which will be capable of holding either of the two types of drills has long been recognized. Thus, it has heretofore been proposed to provide a chuck serving this purpose such as shown, for example, in the Patent No. 824,735 to O. M. Mowat, issued July 3, 1906. One of the troublesome features of the chuck devised by Mowat, however, is that its construction involves manufacturing operations which are much more complicated than are required in the making of the well-known "Almond" type of chuck. For example, in the Mowat chuck, it is necessary that two of the openings, in which the jaws are to be mounted, should be constructed closer together or at a greater angle from the third opening of the chuck body than is usual in the ordinary form of chuck body. It is also necessary to cut away the interior of the chuck body on each side of the openings carrying the specially constructed jaws so as to enable the chuck to accommodate such jaws. Furthermore, the jaws themselves are provided with an outwardly extending lug, thus requiring additional material on the jaws and complicating the machining operations necessary in shaping such jaws to final form.

It is the principal purpose of the present invention to provide a chuck which by the use of a novelly constructed set of jaws which will be capable of satisfactorily gripping drills or bits the shanks of which are either cylindrical or are provided with flat surfaces at their upper ends, said jaws being so constructed that they can be utilized in the ordinary form of chuck body without the necessity of modifying the same in any manner while being as economical to produce as the ordinary form of chuck jaw.

Other objects, as well as the advantages of my improved chuck jaws will become more apparent after a perusal of the following specification taken in connection with the accompanying drawing in which Figure 1 is a vertical section through a chuck constructed in accordance with the invention, the chuck being shown in connection with a drill to illustrate the manner in which the jaws retain a drill having a cylindrical shank and provided with flat surfaces at its upper end; Fig. 2 is a section taken along the line 2—2 of Fig. 1 showing the cylindrical shank of the drill gripped between the jaws; Fig. 3 is a side view of one of the jaws while Fig. 4 is a face view of the jaw shown in Fig. 3; Fig. 5 is a side view of another of the jaws while Fig. 6 is a face view of the jaw illustrated in Fig. 5; and Fig. 7 is a section taken along the line 7—7 of Fig. 1 illustrating the manner in which the flattened upper portion of the drill is clamped between the jaws.

In the drawing, 10 represents the massive chuck body which is preferably made of machinery steel and is provided at its upper end with an arbor hole 11, whereby the chuck is mounted upon a lathe or other machine in the conventional manner. The chuck body is further provided with a plurality of jaw openings 12 which lie at angles substantially one hundred and twenty degrees from one another and which extend lengthwise through the body of the chuck in angular relation to the longitudinal axis of the latter, such openings of the chuck converging toward the lower end of the body where they merge into a common opening and terminating at the bottom face of the chuck to form a substantially three-winged opening, the wings of which are of equal size. The opposite or upper ends of the jaw openings 12 terminate in the periphery of the chuck body at that portion of the chuck body which is surrounded by the ferrule 13, as is clearly shown in Fig. 1. Disposed within the openings 12 are the chuck jaws which are movable in such openings pursuant to a nut control functioning between the threads 15 of the jaws, the threaded ring 14 and the ferrule 13, the ferrule being tightly associated with the ring 14. The ring 14, which is a broken ring, is seated in an annular recess 16 formed in the chuck body and intersecting the jaw openings 12 intermediate their lengths so that the thread of the ring will be enabled to engage with the threads 15 provided in each of the chuck jaws. The ring is provided with gear teeth 17 adapted for cooperation with the teeth of a key when the end of such key is inserted in the socket 18. As the ring 14 is turned either manually through the ferrule 13 or by means of the key, a rotation in one direction will cause the chuck jaws to advance uniformly toward each other while movement in the other direction causes the jaws to retract uniformly from each other.

The parts of the chuck thus far described are standard and known as are also many variations, all operating upon the same general principles. In some chucks of this general type the movement of the jaws is controlled through threads located on the inner portion of the jaws instead of on the outer portions of the jaws and in other chucks ball bearings are used to effect increased tightening and therefore work-piece driving power. Common to all such chucks, however, is the massive body with vertically inclined openings, jaws movable in the jaw recesses, and a nut control for the jaws.

The novel features of this invention are particularly concerned with the construction of the jaws which are used in connection with the chuck body hereinabove described and in the preferred embodiment of this invention three jaws are used although it will be readily apparent that four jaws may be employed. The three jaws illustrated are designated by the numerals 19, 20 and 21, the jaw 19 being different from the jaws 20 and 21 and comprising two faces 22 and 23 which are disposed at an angle of approximately 120° to each other and are continuous throughout their entire length which extends from the bottom end of the jaw up to a point approximately midway of the length of the jaw and above the lower end of the teeth 15 of such jaw. The two surfaces 22 and 23 are disposed at an angle with respect to the length of the jaw so that the apex portion of such faces will, when the jaw is positioned in its proper opening in the chuck, be disposed in parallel relation with the longitudinal axis of the chuck. The apex portion of the two faces 22 and 23 which form the work-engaging edge of the jaw, is recessed approximately midway of its length for a purpose to be hereafter explained, such recess being indicated by the numeral 24.

The two remaining jaws 20 and 21 of the chuck are each provided with two sets of angularly disposed faces, the faces of each set being disposed at approximately 120° to each other. As can be clearly seen in Figs. 5 and 6 which illustrate jaw 20 (jaw 21 being similar in construction), both sets of faces are formed by cutting away the material of which the jaw is constituted at an angle to the longitudinal length of the cylindrical piece from which the jaw is formed. The outer portion of the jaw which contains the forwardly located set of faces 25 and 26 is similar in shape and dimensions to the forwardly located portion of the jaw 19 from the forwardly located end of the latter up to approximately the recess 24 so that the apex portion formed between such forwardly located set of faces 25 and 26 constituting the work-engaging edge of such portion of the jaw and the work-engaging edge of the jaw 19 when such jaws are assembled in the chuck, are spaced the same distance from the longitudinal axis of the chuck body as is the apex portion of the jaw 19. A second or upper set of faces 27 and 28 extend upwardly from the ends of the faces 25 and 26 and lie in angularly-disposed planes which are substantially parallel to the angularly-disposed planes in which the lower set of faces lie, but disposed at a distance from the longitudinal axis of the chuck less than the distance between the faces of the lower set from such axis, so that an angular shoulder 29 is formed between the set of faces 27 and 28 and the set of faces 25 and 26, as can readily be seen in Figs. 5 and 6 of the drawing. The line of juncture of the set of faces 27 and 28 however is contained within the same vertical plane as the line of juncture of the set of faces 25 and 26 and both of such lines of juncture are disposed in substantial parallelism with the longitudinal axis of the chuck. As can be readily ascertained from the drawing, the combined length of the two sets of faces of the jaw 20 is approximately the same as the length of the faces on the jaw 19. The jaw 20 is provided with a recess 30 closely below the angular shoulder 29 being approximately the same distance from the forward end of the jaw as the recess 24 is from the forward end of the jaw 19 so that when the chuck is assembled the recesses 24 and 30 are in alignment.

One of the last operations to which a drill chuck of this type is subjected is the truing up of the gripping edges of the jaws with a small grinding wheel while the assembled chuck is revolved on a true arbor. As the grinding wheel approaches the shoulders 29 of the jaws 20 and 21, the notches 24 and 30 provide a clearance space for the grinding wheel to run out into so as to render it unnecessary to grind it dead up against the shoulders 29.

When the shank of a cylindrical drill or bit is inserted within the chuck body and the jaws are advanced into gripping relation therewith, the two will be securely held between the apex portion formed by the faces 22 and 23 in the case of jaw 19 and the apex portions formed by the faces 25 and 26 of jaws 20 and 21.

When the shank of a drill or bit having flat surfaces at its upper end is inserted or placed within the chuck body the flat surfaces thereof will be engaged by those upper faces of the jaws 20 and 21 which are in opposed relation in the chuck, while one of the arcuately-shaped surfaces of the drill in the region defined by such flat surfaces will be engaged by the inner or rear portion of the work-engaging edge of the jaw 19. The cylindrical shank of the drill will be gripped by the work-engaging edges of the faces 25, 26 of jaws 20 and 21 and by the forward portion of the work-engaging edge of the jaw 19. As is shown in Figs. 1, 2 and 7, the drill is inserted in the chuck until the shoulders formed between the cylindrical portion of the drill and the flat surfaces thereof engage with the shoulders 29 formed in the jaws 20 and 21. A mark may be provided on the lower end of the chuck body to indicate to the workman the proper manner in which the drill is to be inserted, such as, for example, the mark designated 31 in Fig. 2 of the drawing. The mark 31 is preferably disposed opposite to the jaw 19 to indicate that the drill should be inserted with the arcuately-shaped surfaces of the upper end of the drill in line with such mark. The ring 14 is then rotated to move the jaws into engagement with the exterior surfaces of the drill and when such jaws engage the drill, the end portion of the drill will be gripped between the face 28 of the jaw 20 and the face 27 of the jaw 21, as is clearly shown in Fig. 7. The work-engaging edge of the jaw 19 will engage with the curved exterior surfaces of the drill both in the region defined by the flattened surfaces of the drill and the portion of the drill shank immediately below such surfaces, as is shown in Figs. 2 and 7, while the work-engaging edges formed by the lower faces of the jaws 20 and 21 will engage with the curved exterior surface of the drill shank, as shown in Fig. 2.

It will thus be seen, that when the bit or drill is secured in position in the chuck, the inner end portion of the drill will be firmly gripped against rotation by the flat faces 28, 27 respectively, of the jaws 20 and 21 and a portion of the work-engaging edge of the jaw 19, while the shank of the drill will be maintained in properly centered condition by the work-engaging edges formed by the faces 25 and 26 of the jaws 20 and 21 and the outer portion of the work-engaging edge of the jaw 19.

It will be evident from the foregoing that chuck jaws constructed in accordance with my invention will be as economical to produce as the ordinary chuck jaws, will satisfactorily perform the functions for which they were devised, namely to hold drills of varying sizes having flattened surfaces at their upper ends in tightly gripped and fully centered condition in the chuck, and can be used in connection with the ordinarily constructed chuck body without modifying the latter in any particular. This result is achieved by maintaining all of the parts of the jaws 20 and 21 within the cylindrical confines of the jaw apertures, by providing a stepped relation within the limit of said cylinder confines between those parts of said jaws which are configured to engage respectively the cylindrical portions of the flattened portions of a drill shank and by providing the gripping component for the flat shank portions of a drill on that part of the jaw which is parallel to the plane which intersects the axis of the chuck and the axis of the jaw 19. It will also be evident that various changes in the specific form of the invention herein shown and described may be made without departing from the spirit of the invention or going beyond the scope of the following claim.

I claim:

In a chuck body having symmetrically disposed converging cylindrical openings formed therein, jaws mounted within the cylindrical confines of said openings, means for adjusting the position of said jaws in said openings, one of said jaws having converging faces forming a work-engaging apex portion, at least one of the other jaws having two sets of angularly disposed faces, one set being constituted of converging faces forming a work-engaging apex portion, the other set being disposed in stepwise continuation of the other faces of the first set, one of the faces of the second set constituting a work-engaging face adapted to engage with the flattened end portion of a drill, all of the parts of each jaw lying wholly within the bounds of a cylindrical figure having a diameter equal to that of the cylindrical jaw openings.

MINOTT P. HUBBELL.